(12) United States Patent
Sondergard et al.

(10) Patent No.: US 9,371,250 B2
(45) Date of Patent: *Jun. 21, 2016

(54) METHOD FOR STRUCTURING A SURFACE BY MEANS OF ION-BEAM ETCHING, STRUCTURED SURFACE AND USES

(75) Inventors: Elin Sondergard, Cachan (FR); Sébastien Le Roy, Pantin (FR); Alban Letailleur, Paris (FR); Etienne Barthel, Bourg la Reine (FR); Constance Magne, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 757 days.

This patent is subject to a terminal disclaimer.

(21) Appl. No.: 13/513,117

(22) PCT Filed: Nov. 24, 2010

(86) PCT No.: PCT/FR2010/052507
§ 371 (c)(1),
(2), (4) Date: Aug. 1, 2012

(87) PCT Pub. No.: WO2011/067511
PCT Pub. Date: Jun. 9, 2011

(65) Prior Publication Data
US 2012/0288676 A1 Nov. 15, 2012

(30) Foreign Application Priority Data

Dec. 1, 2009 (FR) .................................. 09 05805

(51) Int. Cl.
*B31D 3/00* (2006.01)
*B44C 1/22* (2006.01)
(Continued)

(52) U.S. Cl.
CPC .............. *C03C 14/004* (2013.01); *C03C 15/00* (2013.01); *C03C 21/005* (2013.01); *C03C 2214/08* (2013.01); *C03C 2217/77* (2013.01); *Y10T 428/24355* (2015.01)

(58) Field of Classification Search
CPC .... C03C 14/004; C03C 15/00; C03C 21/005; C03C 2214/08; C03C 2217/77

USPC .......................................................... 216/67
See application file for complete search history.

(56) References Cited

U.S. PATENT DOCUMENTS 6,191,053 B1 2/2001 Chun et al.
6,524,773 B1 * 2/2003 Borrelli et al. ................ 430/322
(Continued)

FOREIGN PATENT DOCUMENTS

| JP | 04-139034 | 5/1992 |
| WO | WO 00/64829 | 11/2000 |
| WO | WO 2004/025334 | 3/2004 |

OTHER PUBLICATIONS

M. Darby Dyar and Mickey E. Gunter, "Mineralogy and Optical Mineralogy", 2008, p. 657.*

(Continued)

*Primary Examiner* — Thomas Pham
(74) *Attorney, Agent, or Firm* — Pillsbury Winthrop Shaw Pittman LLP

(57) ABSTRACT

A process for forming an array of irregularities or features that are submicron-size in height and that have a characteristic lateral dimension that is micron- or submicron-size, over a surface of a material, by ion erosion, the process including: supplying the material with a thickness at least equal to 100 nm, the material being a solid hybrid material that includes: a simple oxide or a mixed oxide of one or more elements, an oxide molar percentage in the material being at least 40%; and a species, of a different nature to the one or more elements of the oxide, a molar percentage of the species in the material ranging from 6 mol % up to 50 mol % while remaining below the percentage of the oxide, most of the species having a largest characteristic dimension smaller than 50 nm, optionally heating the hybrid material before the erosion; structuring the surface of the hybrid material with an erosion that lasts less than one hour over an erosion area greater than 1 cm², until the array of features is formed, the structuring optionally being accompanied by heating of the hybrid material.

13 Claims, 4 Drawing Sheets

(51) Int. Cl.
  C03C 15/00    (2006.01)
  C03C 25/68    (2006.01)
  C23F 1/00     (2006.01)
  C23F 3/00     (2006.01)
  C03C 14/00    (2006.01)
  C03C 21/00    (2006.01)

(56) References Cited

U.S. PATENT DOCUMENTS

| | | | |
|---|---|---|---|
| 6,772,608 B1* | 8/2004 | Drost et al. | 65/30.1 |
| 2002/0186469 A1 | 12/2002 | Kawazu et al. | |
| 2004/0108067 A1* | 6/2004 | Fischione et al. | 156/345.38 |
| 2009/0231714 A1 | 9/2009 | Zhao et al. | |
| 2010/0246016 A1 | 9/2010 | Carlson et al. | |
| 2011/0062849 A1* | 3/2011 | Carlson et al. | 313/110 |

OTHER PUBLICATIONS

International Search Report as issued for International Application No. PCT/FR2010/052507, dated Mar. 2, 2011.
Toma et al., "Ion beam erosion of amorphous materials: evolution of surface morphology," Nucl. Instr. and Meth. in Phys. Res. B, vol. 230, 2005, pp. 551-554.
Dong et al., "Ultrafast dynamics of copper nanoparticles embedded in soda-lime silicate glass fabricated by ion exchange," Thin Solid Films, vol. 517, 2009, pp. 6046-6049.
Armelao et al., "Recent trends on nanocomposites based on Cu, Ag, and Au clusters: A closer look," Coordination Chemistry Reviews, 2006, vol. 250, pp. 1294-1314.
Gervasini et al., "Insight into the properties of Fe oxide present in high concentrations on mesoporous silica," Journal of Catalysis, 2009, vol. 262, pp. 224-234.
Yeshchenko et al., "Optical properties of sol-gel fabricated Ni/SiO$_2$ glass nanocomposites," Journal of Physics and Chemistry of Solids, 2008, vol. 69, pp. 1615-1622.
Feng et al., "Synthesis and characterization of tin oxide nanoparticles dispersed in monolithic mesoporous silica," Solid State Science, 2003, vol. 5, pp. 729-733.
Li et al., "Effect of Incorporation of Silver on the Electrical Properties of Sol-Gel-Derived Titania Film," Journal of Cluster Science, 2008, vol. 19, pp. 667-673.
Ishizaka et al., "Nonlinear optical and XPS properties of Au and Ag nanometer-size particle-doped alumina films prepared by the sol-gel method," Optics Communication, 2001, vol. 190, pp. 385-389.
Gonella et al., "Structural and optical properties of silver-doped zirconia and mixed zirconia-silica matrix obtained by sol-gel processing," Chemistry of Materials, 1999, vol. 11, pp. 814-821.
Kim et al., "Thermowetting embossing nanoimprinting of the organic-inorganic hybrid materials," Thin Solid Films, vol. 476, 2005, pp. 181-184.
Le Roy et al., "Self-sustained etch masking: A general concept to initiate the formation of nanopatterns during ion erosion," Journal of Applied Physics, vol. 106, 2009, pp. 094308-1-094308-5.
Nitschke, U., Low Angle Ion Milling for Transmission Electron Microscopy (TEM), Prakt. Metallogr., vol. 31, 1994, pp. 422-425.
Sharp et al., "Surface Modification by Ion Chemical and Physical Erosion," Surface Science, vol. 118, 1982, pp. 429-442.
Zakka et al., "Roughness Formation During Plasma Etching of Composite Materials: A Kinetic Monte Carlo Approach," IEEE Transactions of Plasma Science, vol. 35, No. 5, Oct. 2007, pp. 1359-1369.
Melliar-Smith et al., "Plasma-Assisted Etching Techniques for Pattern Delineation," Thin Film Processes, Academic Press, Inc., 1978, pp. 497-556.
Dearnaley et al., "Ion Surface Treatment of Materials." in: edited by Pauleau, Y., *Materials Surface Processing by Directed Energy Techniques* (Elsevier, 2006), pp. 151-204 (pp. 185-188).
Yoo et al., "Black surface structures for crystalline silicon solar cells," Materials Science and Engineering B, vol. 159-160, 2009, pp. 333-337.
Stowell et al., "Reactive Ion Etching of Barium Strontium Titanate/Oxide Composites," IEEE, 1996, pp. 859-862.
Schwartz et at., "Reactive Ion Etching." in: Hughes et al., *Proceedings of the Symposium: Etching for Pattern Definition* (Dielectrics and Insulation and Electronics, The Electrochemical Society, Inc., 1976), pp. 122-132.
Cheung, N., "Reactive Ion Etching (RIE)," EE143 Lecture # 16 [online], Nov. 20, 2004 [retrieved on Jul. 12, 2010]. Retrieved from the Internet: <URL:http://www.eng.tau.ac.il/~yosish/courses/vlsi1/1-12-RIE.pdf>.

* cited by examiner

METHOD FOR STRUCTURING A SURFACE BY MEANS OF ION-BEAM ETCHING, STRUCTURED SURFACE AND USES

CROSS-REFERENCE TO RELATED APPLICATIONS

This application is the U.S. National Stage of PCT/FR2010/052507, filed Nov. 24, 2010, which in turn claims priority to French Application No. 0905805, filed Dec. 1, 2009. The content of these applications are incorporated herein by reference in their entirety.

The present invention relates to the field of surface structuring and in particular relates to a process for structuring a surface using ion erosion, to a product with a structured surface and to its uses.

The structuring of materials is of considerable interest because it is applicable to many technological fields.

Creating a network of geometric features allows a material to be given a novel and original function but does not change its composition and its bulk properties.

Due to the small size of the features, which especially have a submicron-size width or period, structuring techniques are mainly techniques that use masks and wet or dry etching; they are especially lithographic techniques (optical lithography, e-beam lithography, etc.) used in microelectronics or in (small) integrated optical components.

They are however unsuitable for mass producing products, especially products made of glass, for one or more of the following reasons:
- their high cost (manufacture of the mask, installation, alignment, etc.);
- their low throughput (scan rate) and their complexity (several steps);
- the limited size of the features (wavelength limited); and
- the small areas that can be structured.

Ion erosion, generally under a large-area, unfocused source of low-energy (typically between 200 and 2000 eV) ions, typically $Ar^+$ ions, is another structuring technique applicable to large areas, this technique having the advantage of not using a mask.

In the publication entitled "Ion beam erosion of amorphous materials: evolution of surface morphology", Nucl. Instr. and Meth. in Phys. Res. B, 230 (2005) pages 551-554, by A. Toma et al., glass was eroded at 35° under a flux of 0.4 mA/cm² of 800 eV $Ar^+$ ions, giving a periodic network of sinusoidal wrinkles of micron-size length and small height, i.e. about 5 nm after one hour and 20 nm after three-and-a-half hours, having a period and width of 175 nm after one hour and of 350 nm after three-and-a-half hours. These morphologies and sizes after one hour and three-and-a-half hours, characterized by atomic force microscopy (AFM), are illustrated in FIGS. 1c and d.

Ion erosion is therefore slow and furthermore generates wrinkles with a low aspect ratio defined by a height to width ratio lower than 0.1.

Thus, the subject matter of the present invention is firstly an effective process for manufacturing a product, especially a glass product, that is structured at the submicron-size scale and that meets various industrial constraints: it is quick and simple to create (no need for a mask, preferably only a single step) and/or suited to an area of any size, even of the largest of sizes, and provides flexibility in and control over the type and/or the size of the features and their density.

This process is also intended to enlarge the range of structured products, especially glass products, available and is especially intended to provide novel geometries and novel functionalities and/or applications.

For this purpose, the invention firstly provides a process for structuring a surface, i.e. for forming at least one array of irregularities called features (generally having the same shape on average) that are submicron-size in height and that have at least one lateral dimension (called the width) that is submicron- or micron-size (submillimeter size) by ion erosion (involving elastic collisions between ions and atoms) with an optionally neutralized (typically by electrons torn by the beam before impact with the material to be structured) ion (typically cation) beam, which comprises the following steps:
- supplying said material with a thickness at least equal to 100 nm, the material being a solid hybrid material that comprises:
  - a simple oxide or a mixed oxide of one or more elements, the oxide molar percentage in the material being at least 40%, especially between 40 and 94%; and
  - at least one species, of a different nature to the one or more elements of the oxide, especially being more mobile than the oxide under the ion erosion (and, in the case of a mixed oxide, more mobile than at least one of the oxides, especially the predominant oxide), which species is preferably a metal, the molar percentage of the one or more species in the material ranging from 6% up to 50%, especially ranging from 20% to 30% or even 40% while remaining below the percentage of said oxide, at least most of the species, even at least 80% or at least 90%, having a largest characteristic dimension (called the size) smaller than 50 nm, preferably 25 nm or less, even 15 nm or less,
  - especially said hybrid material being metastable before the erosion, i.e. kinetically stable under normal temperature and pressure conditions and thermodynamically unstable under normal temperature and pressure conditions, and being in a local potential-energy minimum separated from the global minimum by a given activation energy Ea;
- optionally (pre)heating the material before the erosion, especially in order to reduce (not to zero) the activation energy to a value E1 that is then supplied by the erosion (by an ad hoc selection of the energy of the ions in the beam and the flux), (optional heating because if Ea is too high, the kinetics of the aggregation of the mobile metal species are too slow relative to the rate of erosion of the hybrid material), the (pre)heating and erosion optionally being separated in time, the preheating optionally being replaced by an IR radiation treatment;
- structuring the surface of said hybrid material under said ion erosion, the supply of energy from the ions of the beam thus making said (metastable) hybrid material kinetically unstable, the structure thus being obtained by the formation of a self-assembled mask composed of an array of zones (in the form of droplets) essentially of said metal species, and/or of an array of zones enriched with said metal species of the material, the mask being formed by virtue of the aggregation of said metal species on the surface of said hybrid material,
  - with the erosion of said (metastable) solid hybrid material lasting less than one hour, preferably lasting 30 minutes or less, even 15 minutes or less;
  - the ion beam typically being a beam of one or more noble gases, preferably of Ar or even Ne, Xe, Kr and/or oxygen $O_2$, nitrogen $N_2$ or carbon dioxide $CO_2$;
  - with an erosion area greater than 1 cm², even greater than or equal to 10 cm², achieved using what is commonly called a large-area source, especially a line (long and thin) source, to make scanning the area easier;

the beam preferably having an energy below 5 keV, even an energy of 2 keV or less; and this especially at a normal angle of attack or at a given angle, preferably less than 70°, to the normal to the eroded surface, until said array of features is formed, optionally heating the hybrid material during the erosion, especially so as to reduce (not to zero) the activation energy.

Hitherto, structuring, under ion erosion, of glass, and more widely of oxides, with a high throughput and/or with discrete or "2D" features (as opposed to long periodic wrinkles) has never been observed.

However, the Applicant has identified intrinsic properties of an oxide-based material that. make ion erosion possible and that control the morphology of the surfaces created during the etching.

The oxide and the mobile element will separate if enough energy is supplied to them by the ion erosion.

The mask is created at the same time as the erosion. The intrinsic properties of the material control the surface morphology created during the etching.

It is thus possible to make a directly functional structured material in a single step.

It is thus enough to add at least one ad hoc species to the oxide, the species especially having the following properties that a person skilled in the art will select:

a higher mobility than that of the oxide under ion erosion, in order for segregation and "mask" effects to dominate over surface relaxation which smoothes the surface (thus, to select the species use may be made, for example, of studies of ion diffusion in silicates or other oxides);

an erosion rate that is sufficiently different from that of the oxide in order to increase the structuring rate, the difference (absolute value) preferably being greater than 10%, more preferably greater than 20%, and even more preferably greater than 50% (thus, to select the species use may be made, for example, of known deposition rates, for example for magnetron sputtering); and a sufficiently high cohesion energy to allow its segregation.

There is a sufficient amount of the species over the large erosion area to create the mask and obtain a sufficient density of features.

The species is found to sufficient depth related to the desired etching depth, so as to create the mask during the etching.

The species is in intimate contact with the oxide but is not miscible.

The size of the species is limited for a uniform distribution of the species in the material and therefore a more uniform structure.

The species content in the oxide can be measured by microprobe analysis or XPS. Naturally, after the structuring operation, in the structured thickness, the species content may vary, for example with a concentration profile dependent on height in the structure, and even on the state of the metal.

To attempt to manufacture new features, especially discrete features (bumps; pits), it could be possible to try to generate contamination of the oxide (glass) area in situ during the ion erosion by depositing a metal such as Fe, Au, Ag or Pt, originating from a target placed nearby or from an ion gun.

This process would not allow the amount of contamination to be kept constant over a large area. The amount of contamination is set and limited. This structuring process would therefore be less well controlled, less uniform, and therefore harder to implement on an industrial scale. The range of morphologies is furthermore restricted. The oxidized material contaminated in this way would not be metastable.

The judiciously selected class of oxide/metal hybrid materials according to the invention spontaneously creates a sufficiently dense, uniform mask that self-assembles during the ion erosion, thereby leading to one or more of the following characteristics:

a uniform structure, i.e. an average height H, an average shape and an average density that are similar over the entire area eroded;

novel recessed features;

novel, generally round (circular), recessed 2D features having an average lateral dimension, or width W, that is submicron-size, the features optionally being substantially symmetric and therefore having an average maximum lateral dimension, or length L, that is submicron-size and similar or substantially equal to the width (width W about=length L, or at least the width W is greater than or equal to 0.3L for an oblique angle of attack and greater than or equal to 0.8L for a normal angle of attack), the recesses being oriented along the angle of attack;

novel 2D relief features with generally rounded (circular) edges, for example cones or bumps, having an average lateral dimension or width W that is submicron-size, the features optionally being substantially symmetric and therefore having an average "maximum" lateral dimension, or length L, that is submicron-size and similar or substantially equal to the width (width W about=length L or at least the width W is greater than or equal to 0.3L for an oblique angle of attack and greater than or equal to 0.8L for a normal angle of attack), the reliefs being oriented along the angle of attack;

features that are optionally isotropic, i.e. that have no privileged direction(s) of orientation, typically the case for a normal or near-normal angle of attack;

features that are optionally anisotropic, typically the case for oblique angles of attack;

a dense network of features, i.e. having a ratio of the average separation D to the width W of less than 10, of 5 or less, or even of 2 or less, and this over an area of 1 $cm^2$, 100 $cm^2$ or even 1 $m^2$; and a feature height H that is possibly greater than in the prior art and that is obtained rapidly.

For each feature, the height taken into account is the maximum height; the width is measured at the base. The separation D is the average distance between the centers of two adjacent features.

The distances H, W, D may be measured by AFM and/or scanning electron microscopy SEM. The averages are for example obtained for at least 50 features.

The structured material comprises an array of features, generally having:

an average height H greater than 5 nm, even greater than or equal to 30 nm, even 50 nm;

an average width W possibly less than 300 nm, especially for optical applications, and preferably less than 200 nm; and an average separation D of less than 300 nm and preferably less than 200 nm.

The aspect ratio (H/W) may be greater than 3.

The density, i.e. D/W, may depend on the height.

Preferably, the width W is less than or equal to 5D, especially less than D.

The mean square deviation in the height H and the width W may be less than 30% (for example at high temperature and high flux), or 10% or less, or even 5% or less.

The mean square deviation in the separation D may be less than 50% (for example at high temperature) or less than 30%, or even 10% or less.

The structure is not created by physical ion/surface interactions (independent of the composition) such as described by conventional Bradley-Harper theory.

The hybrid material may be termed metastable. The known definition of metastability is the capacity of a material to be kinetically but not thermodynamically stable. The transition to the steady state either occurs slowly or at a zero rate. If a physico-chemical system is represented by its potential energy, a metastable state will be characterized by a state that corresponds to a local potential-energy minimum. In order for the system to be able to reach the state of global minimum energy corresponding to the state of thermodynamic equilibrium, an amount of energy, called the activation energy Ea, must be supplied to it.

For a given hybrid, the activation energy may depend on the manufacturing process.

The structure is not a consequence of the enrichment of the surface with one of the components, but is induced by the intrinsic metastability of the material. This metastability is controlled by the selection of the oxide and the mobile species.

The hybrid material may consist essentially of mineral material. The sum of the oxide and said metal may form at least 70 mol % of the hybrid material.

The hybrid material may contain other "neutral" elements for the ion erosion (especially less than 30%).

The structuring process according to the invention may be easily automated and associated with other conversion operations carried out on the product. The process also simplifies the production sequence. The process is suited to large-volume and/or large-scale manufacture of products, especially glass products for the electronics, construction or automotive industries, especially windows. The structuring process according to the invention furthermore allows the characteristic dimensions of the features to be made ever smaller over larger and larger areas, with an acceptable tolerance to texturing defects, i.e. one that does not impair the desired performance.

The ions may instantaneously supply sufficient energy for the structuring (exceeding the activation energy).

The erosion process furthermore naturally heats the oxide to about 80° C., even 100° C. (depending on the energy and the flux), gradually over a few minutes, which may alone be enough to provide the activation energy or, alternatively, additional heating may be necessary as seen above, the temperature then being adjusted. The optional heating required is greater if the species content is chosen to be low.

The temperature reached at the surface varies depending on the hybrid material and on the conditions of the structuring operation. The reference temperature is the temperature of the backside of the material (side opposite the eroded surface).

More generally, the temperature may also play a role in the structuring of the hybrid material according to the invention.

Moreover, to initiate or modify the structure (modification of the feature and/or acceleration), for example to increase the height of the reliefs (or bumps) or the aspect ratio, or to decrease the density, the material is heated to a temperature above 50° C., even 70° C. or more, preferably 100 even 120° C. or more, especially to a temperature ranging from 150° C. to 300° C., before the erosion and/or during (all or some of) the erosion.

There is a contest between segregation and relaxation during the ion erosion. Heating, during the erosion, preferably to a given controlled temperature, surprisingly enhances the segregation over the relaxation and structuring is therefore promoted.

If the temperature is increased in a relief configuration, the species forms larger aggregates (in the peaks of the reliefs), which aggregates are more spaced out, and the height of the reliefs is therefore especially increased and the space between reliefs is also increased.

The temperature of the heating/energy-supply operation may furthermore be limited (for reasons of the cost of energy and/or the withstand capability of associated material or materials, for example the limited thermal withstand capability of an organic substrate bearing a film of the hybrid material).

The flux may play a role in the structuring of a hybrid material according to the invention.

To accelerate the structuring, the etching flux is greater than 0.01 mA/cm$^2$, typically ranging from 0.05 to 0.3 mA/cm$^2$ or more, the flux especially being 0.4 mA/cm$^2$ or more.

Sufficiently increasing the flux makes it possible to reduce the structuring time, but it may also modify the appearance of the structures formed in the same way as increasing temperature does (increased relief but decreased density).

The energy of the incident ions may play a role of paramount importance in the structuring of a hybrid material according to the invention.

The effect of the energy is complex. It increases the erosion rate but also the penetration depth of the ions, thereby enabling more effective volume diffusion of the species. There will therefore be both an acceleration in the rate at which structures are formed, but the structures will also be of greater width and height.

In contrast, depending on the material, above a certain threshold (typically 1000 eV) too high an energy will reduce the effectiveness of the mask, until the structuring is prevented.

The energy may lie between 200 eV and 5000 eV, typically between 300 eV and 2000 eV, even preferably between 500 eV and 1000 eV.

Naturally, heating, a high flux and/or a high energy may be combined to obtain a wide variety of width/height/density configurations.

Because it is effective, the duration of the erosion leading to a novel structure (bumps and pits) and/or a structure having a novel height (greater than 50 nm) and/or a regular spacing (etc.) may be 30 minutes or less, even 15 minutes or less.

In order to create the extended ion source, the erosion is carried out under vacuum, for example under a vacuum defined by a pressure lower than $1 \times 10^{-7}$ mbar. The source may for example be a thin-film deposition reactor.

Since said species has an erosion rate lower than that of the oxide, especially when the species chosen is silver, the feature eroded is a hole, i.e. the basic feature repeated over the area is a depression, especially having an average maximum lateral dimension, called the length L, that is submicron-size, and especially having a width W greater than 0.3L for an oblique angle of attack and greater than 0.8L, even 0.9L, for a normal angle of attack.

Said species has an erosion rate that is lower than that of the oxide.

Especially when the species chosen is copper, the feature erored is a relief. The relief may especially be discrete and conical, especially having an average maximum lateral dimension, called the length L, that is submicron-size, and especially having a width W greater than 0.3L for an oblique angle of attack and greater than 0.8L, even 0.9L, for a normal angle of attack.

This is because said species has an erosion rate lower than that of the oxide.

Before it has been structured according to the invention, the surface is not necessarily smooth and may have already been structured.

In the structurable hybrid material (or in the thickness underlying the structured surface), the species may optionally be ionized (therefore oxidized) or it may not be, it may be diluted (isolated in the material) and/or even in aggregate form, the aggregates preferably being (substantially) spherical.

This depends on the process used to manufacture the structurable hybrid material, and on its incorporation process in particular.

The species may be incorporated by ion implantation (by ion bombardment), by ion exchange, or by incorporation of particles or in situ growth (from metal salts, etc.) as described below.

The species is preferably chosen from at least one of the following, especially metal, species:
 silver Ag, especially for an optical function (absorption induced at the UV/visible boundary) and/or catalytic and/or antibacterial function;
 copper Cu, especially for an optical function;
 gold Au, for grafting biological molecules, for sensors, for (nonlinear) optics, and/or for an antibacterial function;
 cobalt Co, for a magnetic function;
 iron Fe, for a magnetic and/or catalytic function;
 platinum Pt, for a catalytic function;
 nickel Ni, for a magnetic and/or catalytic function;
 tin Sn, for electrical functions; and
 even gallium Ga, antimony Sb or indium In, for a display or broadcasting function.

Lead Pb and molybdenum Mo are preferably not used for environmental reasons.

Several metals can form an aggregate providing a given functionality, Co/Pt for a magnetic memory for example.

Use of other transition metals such as Ti, Nb, Cr, Cd, Zr (in particular in silica), Mn may be envisioned.

For a more effective structuring, the effective charge on the species is zero or less than 0.5 (given by EELS) so as to allow the species to aggregate.

The oxide alone may be an electrical insulator and the species may provide electrical conductivity properties.

Especially for silica, aluminum Al and boron B are preferably not used because they integrate into the silica lattice and do not aggregate easily.

More particularly, transition metals and even certain metalloids are preferred to alkali or alkaline-earth metals that have too high an erosion rate. Thus, for glass, it may be stated that Li and Na are not suitable because they are sputtered and do not aggregate (fast enough).

The oxides may furthermore be transparent (enough) in the visible and even in a range that extends into the near or far IR and even the near UV depending on the targeted applications.

A mixed oxide may be used, the mobile species not aggregating (under normal temperature and pressure conditions) but still being sufficiently mobile under ion erosion to form the structures.

The oxide is preferably chosen from at least one of the following oxides: silica, alumina, zirconia, titanium oxide, cerium oxide, magnesium oxide, especially mixed aluminum/silicon oxide, mixed zirconium/silicon oxide, mixed titanium/silicon oxide and preferably a glass.

There are several hybrid materials according to the invention.

The hybrid material may firstly be an ion-exchanged glass, especially a soda-lime glass, preferably ion exchanged with at least one of said following species: silver, copper—these species being ionized during the exchange.

The exchange depth is typically about one micron but it can be up to several tens of microns deep. The exchanged metal is therefore almost uniformly distributed in the eroded part of the material (<1 µm).

Ion exchange is the capacity of certain ions in the glass, in particular cations such as alkali-metal ions, to be exchanged with other ions having different properties.

The ion exchange may be the exchange of certain ions in the glass with ions chosen from, whether in combination or not, barium, cesium, thallium, and preferably silver or copper.

Silver is very mobile in the matrix and has a strong tendency to aggregate.

The exchanged ion content in the hybrid material can be measured using a microprobe before and after the structuring operation.

The ion exchange is obtained by known techniques. The surface of the glass substrate to be treated is placed in a bath of molten salts of the exchange ions, for example silver nitrate ($AgNO_3$), at a high temperature between 200 and 550° C., and for a sufficient period of time corresponding to the desired exchange depth.

The glass in contact with the bath may advantageously be concomitantly subjected to an electric field that mainly depends on the conductivity of the glass and its thickness, and preferably varies between 10 and 100 V. In this case, the glass may then undergo another heat treatment, advantageously at a temperature lying between the exchange temperature and the glass transition temperature of the glass, in order to diffuse the exchanged ions in a direction normal to the face of the glass provided with the electrode, so as to obtain an index gradient with a linear profile.

The glass chosen may be extra-clear glass. The reader may refer to application WO 04/025334 for the composition of an extra-clear glass. In particular a soda-lime-silica glass containing less than 0.05% Fe III or $Fe_2O_3$ may be chosen. Diamant glass from Saint-Gobain, Albarino glass (whether textured or smooth) from Saint-Gobain, Optiwhite glass from Pilkington or B270 glass from Schott may, for example, be chosen.

The ion exchange thus enables easy, industrially reproducible treatment of large areas. It allows the glass to be worked on directly and simply without intermediate and/or additional steps such as film deposition or etching being required.

Silver is, for example, used. The depth to which silver ions $Ag^+$ diffuse in the glass, replacing sodium ions $Na^+$, is a function of the time the substrate is left in the bath.

As a variant to the $AgNO_3$ bath, a film of silver metal may be deposited. This film is deposited by magnetron sputtering, CVD, ink-jet printing, or screen printing. A film forming an electrode is moreover deposited on the opposing face. The electric field is then applied between the silver film and the metal film. After the exchange, the electrode film is removed by polishing or chemical etching.

The electric field applied between the metal film or the bath and the electrode therefore causes the ion exchange. The ion exchange is carried out at a temperature of between 250° C. and 350° C. The exchange depth is a function of the field strength, the time that the substrate is subjected to this field and the temperature at which the exchange is carried out. The field strength lies between 10 and 100 V.

For example, such ion exchange may be carried out for 10 hours on a 2 mm-thick sheet of, preferably extra-clear, glass at a temperature of 300° C. and under a 10 V/mm field.

Conventional soda-lime glass such as Planilux glass from Saint-Gobain may be used to obtain silver nanoparticles after ion exchange with the glass. The penetration depth and size of the silver particles may be modified by varying the experimental conditions: increasing the duration and the temperature of the exchange gives larger particles to a greater depth and therefore a more marked yellow color. Adding an electric field during the exchange allows the penetration depth to be increased without increasing the particle size. Thus, the penetration depth may be adjusted to correspond to the erosion depth so that the yellowing disappears after the erosion, or the penetration depth may be slightly greater than the erosion depth by a few microns if the yellowing is less pronounced and therefore optically acceptable after the erosion.

Mention may be made, by way of exemplary copper-exchanged glass, of the publication by Dong et al. entitled "ultrafast dynamics of copper nanoparticles embedded in sodalime silicate glass fabricated by ion exchange" Thin Solid Films 517 (2009) pages 6046-6049.

The exchanged, structured glass may be a monolithic, laminated or two-component unit. After the structuring operation has been carried out, the exchanged, structured glass may also be subjected to various glass conversion operations: tempering, shaping, laminating, etc.

The hybrid material may be a bulk material or a film added over the entire substrate, whether the substrate is thick or thin, flat or curved, opaque or transparent, mineral or organic. The film made of the structurable hybrid material may be adhesively bonded to, etc. or preferably deposited on an especially glass substrate. This film may be part of a (thin) film multilayer present on the, especially glass, substrate.

This film made of the structurable hybrid material may preferably be transparent and have a refractive index that is for example greater than that of the glass (typically about 1.5).

The film made of the structurable hybrid material may be deposited by any known deposition technique directly on the substrate or on one or more underlying (thin, etc.) functional films.

In particular, it may be deposited on a (thin) functional film, for example a functional oxide film such as a transparent conductive oxide (TCO) such as ITO (indium tin oxide), ZnO, a mixed or simple oxide based on tin, indium or zinc or a photocatalytic film ($TiO_2$ in the anatase form for example).

This hybrid-material film may advantageously be deposited on an alkali-metal barrier film (typically made of $Si_3N_4$ or $SiO_2$) in order to prevent alkali-metal ions from migrating from the glass into the film during various heat treatments (anneal or temper, etc.).

The substrate is not necessarily a mineral substrate and it may be made of plastic or a hybrid material in order to obtain flexibility and shaping properties that cannot be accessed with glass substrates. In this case, the system used must have a low activation energy, because heat treatment at a temperature above 300° C. and most often above 200° C. is not possible.

It is possible to provide a step of depositing said film made of the hybrid material, the step being carried out on a structuring production line.

The hybrid material may be a bulk sol-gel or a sol-gel film, especially a film on a transparent, (mineral or organic) glass substrate. Sol-gels have the advantage of withstanding even high-temperature heat treatments (for example (bending) tempering operations) and UV exposure.

This may especially be an oxide, obtained by the sol-gel process, of at least one of the following elements: Si, Ti, Zr, Al, V, Mg, Sn and Ce and incorporating said metal or metalloid in the form of optionally precipitated (nano)particles, especially of Ag, Cu or Au.

The nanoparticles are preferably uniformly distributed in the bulk material and/or film. Preferably the largest dimension of the particles (formed or inserted, discrete or clustered; precipitated) is smaller than 25 nm and even more preferably smaller than 15 nm, and the aspect ratio of the particles is less than 3, the particles preferably being spherical.

The nanoparticle content in the sol-gel can be measured by microprobe, XPS or EDX.

For example, silica has the definite advantage of being a transparent oxide, titanium oxide and zirconia of having high refractive indices. By way of indication, at 600 nm, a silica film typically has a refractive index of about 1.45, a titanium-oxide film a refractive index of about 2 and a zirconia film a refractive index of about 2.2.

The film may essentially be based on silica, especially because it adheres well to and is compatible with a glass substrate.

The sol precursor of the material forming the silica film may be a silane or silicate precursor.

For an (essentially) inorganic film, a film based on tetraethoxysilane (TEOS) or potassium, sodium or lithium silicate may be chosen and for example deposited by flow coating.

The silica film may thus be based on an aqueous solution of sodium silicate converted into a hard film by exposure to a $CO_2$ atmosphere.

The manufacture of a bulk hybrid material using the sol-gel process for example comprises the following steps:

hydrolysis of the precursor of the constituent material of said oxide, especially hydrolysis of a hydrolyzable compound such as a halide or alkoxide, in a solvent, especially an aqueous and/or alcoholic solvent, then maturing the sol;

mixing a colloidal suspension of particles of said metals in a solvent, especially an aqueous and/or alcoholic solvent, and/or a salt of said metal into the sol in order to grow particles of said metals in situ, this addition possibly taking place at the start of the hydrolysis or after the sol has matured enough to limit the reaction kinetics; and condensing the precursor and optionally removing the solvent so as to increase the viscosity and obtain a solid gel.

The manufacture of a film of hybrid material using the sol-gel process for example comprises the following steps:

hydrolysis of the precursor of the constituent material of said oxide, especially hydrolysis of a hydrolyzable compound such as a halide or alkoxide, in a solvent, especially an aqueous and/or alcoholic solvent, then maturing the sol;

mixing a colloidal suspension of particles of said metals in a solvent, especially an aqueous and/or alcoholic solvent, and/or a salt of said metal into the sol in order to grow particles of said metals in situ, this addition possibly taking place at the start of the hydrolysis or after the sol has matured enough to limit the reaction kinetics;

depositing, for example by spin coating or flow coating, the film and evaporating the solvent; and carrying out a heat treatment so as to condense the precursor and possibly remove the solvent.

The choice of the colloidal suspension allows the size of the inserted particles to be adjusted if necessary. As the suspension is dispersed in the sol, its compatibility with the sol is monitored to prevent aggregation of the particles. Adding the salt of said metal is much easier and reported more often in the literature.

Water or low-molar-mass alcohols with a low boiling point (typically below 100° C.) are preferred as the solvent so that the metal salt can dissolve properly.

The number of nanoparticles present in the oxide/metal hybrids can be easily controlled by controlling the synthesis conditions, the number of nanoparticles increasing with the amount of metal introduced into the sol.

The formation of hybrid metal/metal-oxide materials using the sol-gel process is widely described in the literature. A wide variety of metal/oxide pairs in the form of films or bulk materials has thus been synthesized. The metal particles are preferably created in situ in the matrix by adding a salt of the corresponding metal and by applying a reducing treatment afterwards (most often a heat treatment or otherwise a treatment using a reducing agent: $H_2$, hydrazine, etc.).

In the publication entitled "Recent trends on nanocomposites based on Cu, Ag, and Au clusters: A closer look" (L. Armelao et al., Coordination Chemistry Reviews, 2006, 250, page 1294), it is reported that up to 10 wt % of silver and copper salt was introduced into silica films obtained by the sol-gel process and that particles of Ag metal or $Cu/CuO_x$ particles of a few nm in size were obtained in a controlled way after a heat treatment (at a temperature above 500° C.). The author demonstrates the importance of the heat treatment on the size and oxidation state of the particles obtained and also reports that other metal or oxide particles were obtained in a silica matrix. Most often, a porous matrix is used as the host for the nanoparticles. However, it is possible, based on these studies, to obtain a material with no artificial porosity. Thus, in the publication "Insight into the properties of Fe oxide present in high concentrations on mesoporous silica" (Gervasini et al. Journal of Catalysis 2009, 262, page 224), mesoporous silica (i.e. having a characteristic pore size of 3-10 nm) containing up to 17 wt % of $Fe_2O_3$ catalytic particles was obtained.

In the publication entitled "Optical properties of sol-gel fabricated $Ni/SiO_2$ glass nanocomposites" (Yeshchenko O. A. et al., Journal of Physics and Chemistry of Solids, 2008, 69, page 1615), it was reported that nickel nanoparticles were obtained for optical applications by heat treating nickel nitrate impregnated in a silica matrix. Finally, in the publication entitled "Synthesis and characterization of tin oxide nanoparticles dispersed in monolithic mesoporous silica" (Y. S. Feng at al., Solid State Science, 2003, 5, page 729), 4-6 nm $SnO_2$ particles were obtained at 20% in the mesoporous silica after a heat treatment at 600° C.

By virtue of the sol-gel process, matrices other than silica matrices may be used. The most important point is to control the stability of the sol of the organometallic precursor in the presence of the salt of the desired ion. Thus, in titanium oxide, silver nanoparticles may be used to increase conductivity or photocatalytic activity. In the publication entitled "Effect of incorporation of silver on the electrical properties of sol-gel derived titania film" (Hong Li et al., Journal of cluster science, 2008, 19, pages 667-673), 5-15 nm Ag nanoparticles were incorporated in an anatase $TiO_2$ matrix up to 10%. In the publication entitled "Nonlinear optical and XPS properties of Au and Ag nanometer-size particle-doped alumina films prepared by the sol-gel method" (T. Ishizaka, Optics Communication, 2001, 190, pages 385-389), 5-12 nm particles of gold or silver were incorporated in alumina membranes up to 1% for nonlinear optics. Increasing the precursor content allowed more highly doped matrices to be obtained. Finally, in the publication "Structural and optical properties of silver-doped zirconia and mixed zirconia-silica matrix obtained by sol-gel processing" (F. Gonella et al., Chemistry of Materials 1999, 11, pages 814-821), Ag nanoparticles were introduced into films of zirconia or mixed zirconium oxides up to 10%. The composition of the matrix allowed the aggregation of the silver to be controlled.

In addition, this sol-gel method enables additional functionalities to be given to the film. The surface structured by said process may then be functionalized to obtain novel wetting properties. In particular, patent WO 00/64829 describes the creation of a hydrophobic and oleophobic coating comprising at least one fluoroalkoxysilane having the general formula $CF_3-(CF_2)_m-(CH_2)_nSi(X)_{3-p}R_p$ n(where m=0 to 15, n=1 to 5, p=0, 1 or 2 and where X is a hydrolyzable group and R an alkyl group), a system of aqueous solvents preferably consisting of an alcohol and about 10% water, and at least one catalyst chosen from an acid and/or a Brønsted base. This compound may be deposited over wide areas (greater than 1 $m^2$) of glass products or functional metal-oxide films, in particular textured products, after a silica-based primer layer has optionally been deposited. The combination of this process and the surface texture yields superhydrophobic properties (of the lotus-effect type).

The preferred methods for depositing the organic films are dip coating or spraying of the sol followed by spreading of the droplets by doctoring or brushing, or even by heating as especially described in the article entitled "Thermowetting structuring of the organic-inorganic hybrid materials" W-S. Kim, K-S. Kim, Y-C. Kim, B-S Bae, 2005, thin solid films, 476 (1), pages 181-184. The chosen method may also be spin coating.

Naturally, an anneal at at least 400° C. is preferred, especially an anneal above 500° C., for at least 30 minutes and even for 1 hour, in order to sufficiently condense the oxide, reduce the activation energy and form aggregates of said metal, and below 800° C., especially up to 750° C., so as to provide a sufficient reaction rate and so as not to damage the glass substrate.

This anneal may advantageously be combined with the step of tempering the glass, which operation consists in heating the glass to a high temperature (typically between 550° C. and 750° C.) and then rapidly cooling it.

There are other structurable hybrid-material films.

Said hybrid material may be a film deposited by physical vapor deposition, typically by evaporation or sputtering (especially magnetron sputtering), on a substrate, especially a transparent, glass substrate, especially by codeposition of the species (from the aforementioned list), such as copper, silver or gold, and the oxide, especially silica, zirconia, tin oxide or alumina, using a target made of the oxide element in an oxygen atmosphere, or using a target made of said oxides.

Sputtering is generally preferred to evaporation because of its much higher deposition rate, in order to manufacture 100 nm thick or even micron-size films more rapidly. Thus, if the deposition rate for evaporation is generally about 1 A/min, with a maximum rate of 1 A/s, magnetron sputtering deposition rates typically lie between 1 A/s and several tens of nm/s.

For example, to deposit a mixed $SiO_2$/copper film, it is possible to employ either codeposition using silicon and copper targets, with oxygen being introduced, or to employ a copper target and a silica target directly.

The substrate may be a glass substrate. Within the context of the invention, the expression "glass substrate" is understood to mean either a mineral glass (soda-lime-silica, borosilicate, glass-ceramic, etc.) substrate or an organic glass (for example a thermoplastic polymer such as a polyurethane or a polycarbonate) substrate.

Within the context of the invention, a substrate is termed "rigid" when, under normal temperature and pressure conditions, it has a modulus of at least 60 GPa for a mineral element and at least 4 GPa for an organic element.

The glass substrate is preferably transparent, especially having an overall light transmission of at least 70 to 75%.

With regard to the composition of the glass substrate, a glass having a linear absorption below 0.01 mm$^{-1}$ in the part of the spectrum useful to the application, generally the spectrum ranging from 380 to 1200 nm, is preferably used.

Even more preferably, extra-clear glass, i.e. glass having a linear absorption below 0.008 mm$^{-1}$ in the wavelength spectrum ranging from 380 to 1200 nm, is used. For example, glass sold under the tradename Diamant by Saint-Gobain Glass may be chosen.

The substrate may be a monolithic, laminated or two-component substrate. After the structuring operation has been carried out, the substrate may also be subjected to various glass conversion operations: tempering, shaping, laminating, etc.

The glass substrate may be thin, for example about 0.1 mm in thickness for mineral glass or 1 mm in thickness for organic glass, or thicker, for example having a thickness greater than or equal to a few mm even cm.

A step of depositing a conductive, semiconductor and/or hydrophobic film, especially an oxide-based film, may be carried out after the or a first structuring operation.

This deposition is preferably carried out continuously.

The film is for example a metal film made of silver or aluminum.

Advantageously, a step may be provided for selectively depositing a conductive film (especially a metallic oxide-based film) on the structured surface, on or between features that are for example dielectric or less conductive.

The, for example, metal, especially silver or nickel, film may be deposited by electrodeposition. In the latter case, to form an electrode for the electrodeposition, the structured film may advantageously be a conductive (semiconductor) film or a dielectric film of the sol-gel type doped with metal particles or even a multilayer with a conductive top seed layer.

The chemical potential of the electrolyte mixture is adapted to promote deposition in high-curvature zones.

After the film has been structured, transfer of the array of features into the glass substrate and/or an underlying layer may be envisioned, especially by etching.

The structured film may be a sacrificial film, which may be partly or completely removed.

In one embodiment, the structured surface may be split into structuring fields, each structuring field containing distinct features (differing in their shape, one of their characteristic dimensions, especially their separation) and/or features with a distinct orientation.

During manufacture of the material, the content of the mobile species and/or the number of mobile species may be different from one zone to another.

Certain zones of a bulk or thin-film oxide may be masked so that the mobile species is not incorporated, or in order to modify locally the incorporation conditions.

Naturally, the structured film may also serve as a mask for an underlying film or the adjacent substrate.

The invention also relates to a product with a structured surface, i.e. with an array of irregularities or features that are submicron-size in height and that have at least one (sub) micron-size characteristic lateral dimension, this solid hybrid material comprising:

a simple oxide or a mixed oxide of one or more elements, the oxide molar percentage in the material being at least 40%, especially between 40 and 94%; and at least one species, of a different nature to the one or more elements of the oxide, and which is especially a metal, the molar percentage of the one or more species in the material ranging from 6 mol % up to 50 mol % while remaining below the percentage of said oxide, the species having a maximum largest characteristic dimension smaller than 50 nm, able to be obtained using the process described above.

The structured product may be intended for application in electronics, buildings, or automotive vehicles or even for a microfluidic application.

Mention may especially be made of various products, especially glazing units:

having modified chemical properties ("super"-hydrophobicity, hydrophilicity);

having optical properties, especially for illumination systems or systems for backlighting flat LCD displays, especially a light extraction means for a light-emitting device, optical products for example intended for display screen, illumination or signaling applications;

for buildings, especially a solar and/or thermal control glazing unit.

The function and the properties associated with the structure depend on the characteristic dimensions H, W and D.

The range of optical functionalities of nanostructured products is large. The product may have at least one of the following characteristics:

the feature is a relief, especially having an average maximum lateral dimension, called the length L, that is submicron-size, and especially having a width W greater than 0.3L for an oblique angle of attack and greater than 0.8L for a normal angle of attack, the material especially being richer in mobile species in the peaks of the reliefs and through a thickness smaller than 10 nm, called the superficial thickness;

it is an ion-exchanged glass, ion exchanged with silver or copper, or it is a bulk sol-gel or sol-gel film, comprising said species, especially silver or copper and/or gold, on a substrate, especially a transparent substrate;

the feature is a hole of height h, especially having an average maximum lateral dimension, called the length L, that is submicron-size, and especially having a width W greater than 0.3L for an oblique angle of attack and greater than 0.8L for a normal angle of attack, the material especially being richer in metal at the base of the hole and through a thickness smaller than 10 nm, called the superficial thickness;

the feature is defined by a height H and a width W and a distance D between an adjacent feature;

the distance D being chosen to be smaller than 5 µm for microfluidic applications or for wetting properties, smaller than 2 µm for infrared applications and smaller than 500 nm, preferably smaller than 300 nm and more preferably smaller than 200 nm for optical applications even extending into the infrared (antireflection, light extraction and light collection for photovoltaics or photocatalysis, etc.);

the height H preferably being chosen to be greater than 20 nm, more preferably greater than 50 nm and even more preferably greater than 100 nm for optical (visible and infrared) applications, and greater than 70 nm, preferably greater than 150 nm, for wetting properties (superhydrophobicity or superhydrophilicity);

the width W being chosen to be greater than D/10, more preferably greater than D/5 and even more preferably greater than D/2;

the feature is defined by a height H and a width W and a distance D between an adjacent feature;

the distance D being chosen to be smaller than 5 μm for microfluidic applications or for wetting properties and smaller than 2 μm for infrared applications;

the height H preferably being chosen to be greater than 70 nm, more preferably greater than 150 nm for wetting properties (superhydrophobicity or superhydrophilicity); and the width W being chosen to be greater than D/10, more preferably greater than D/5 and even more preferably greater than D/2.

The eroded area may form a substrate for growth of a vacuum-deposited thin film, the feature being defined by a height H and a width W and a distance D between an adjacent feature:

the distance D being chosen to be smaller than 200 nm, preferably to be between 200 nm and 100 nm, more preferably to be smaller than 50 nm;

the height H preferably being chosen to be greater than 20 nm, more preferably greater than 50 nm; and the width W being chosen to be greater than D/10, preferably greater than D/5 and more preferably greater than D/2.

The relief may especially be discrete and conical.

For features in relief, the peaks of the reliefs are enriched with said metal through a thickness, called the superficial thickness (smaller than the implantation wavelength of the ions of the beam), typically of 2 to 10 nm.

For recessed features, the bottoms of the recesses are enriched with said metal through a thickness (smaller than the implantation wavelength of the ions of the beam) typically of 2 to 10 nm.

The presence of metal-enriched zones can be verified by known microscopy techniques: TEM, STEM, and/or by chemical mapping using known microscopy or spectroscopy techniques: STEM, EELS, EDX.

Two main areas of said material may be structured with similar or distinct features, simultaneously or in succession.

The structured product may be a solar and/or thermal control glazing unit used in a microfluidic application, a glazing unit with an optical function such as an antireflection function, a reflective polarizer in the visible and/or infrared, an element for redirecting light forwards, especially for a liquid-crystal display, a means for extracting light from an organic or inorganic light-emitting device, or a superhydrophobic or superhydrophilic glazing unit.

Other details and advantageous characteristics of the invention will become clear on reading the examples illustrated by the following figures:

FIG. 6 shows a schematic of a structured glass product obtained with the manufacturing process described with respect to FIG. 5a;

EXAMPLE OF A FIRST ION-EXCHANGED STRUCTURED GLASS

A first 2 mm-thick silver-ion-exchanged glass pane was obtained after ion exchange with a conventional pane of Planilux® soda-lime float glass from Saint Gobain.

The ion exchange consisted in exchanging sodium ions in the glass with silver from a bath of silver nitrate.

In a first step, the glass was immersed in pure silver nitrate at 300° C. for 2 hours.

The glass obtained had a silver concentration profile from the surface to a depth of several microns.

It was observed that the glass had a slightly yellow color. This color is characteristic of silver nanoparticles. Part of the silver that had penetrated into the glass had been reduced and had aggregated into nanoparticles of a few nanometers in size during the exchange reaction.

The silver had therefore penetrated to a depth of about 4 microns. The silica percentage remained constant, the surface having an almost linear silver concentration profile. It was indeed sodium that had been exchanged with the silver and not calcium, potassium or any other cation in the glass. Silver was therefore probably present in the form of particles to a depth of a few microns.

The surface contained about 15 mol % Ag.

The erosion was carried out in an ultra-high vacuum reactor with a base pressure of $5 \times 10^{-8}$ mbar. The flux of the beam of $Ar^+$ ions having 500 eV of energy was maintained at 0.09 mA/s·cm².

AFM micrographs of the surface of the silver-ion-exchanged glass show that a texture composed of holes appeared after the erosion. These holes, which are densely distributed and a few hundred nanometers in diameter, appeared after 30 minutes under the beam.

FIGS. 1a-1d show a set of four AFM micrographs of a structured bulk hybrid silica/metal material for various times in a first embodiment of the invention.

FIGS. 1a-1d show AFM micrographs of an area of Planilux glass that was ion exchanged with silver after erosion for 6, 12, 15 and 30 minutes using a beam of $Ar^+$ ions having an energy of 500 eV and a flux of 0.09 mA/s·cm².

The silver aggregated and diffused toward the surface where it was eroded more rapidly than the silica. This high silver erosion rate is moreover often observed in magnetron deposition.

Figures 1A, 1B, 1C, 1D:
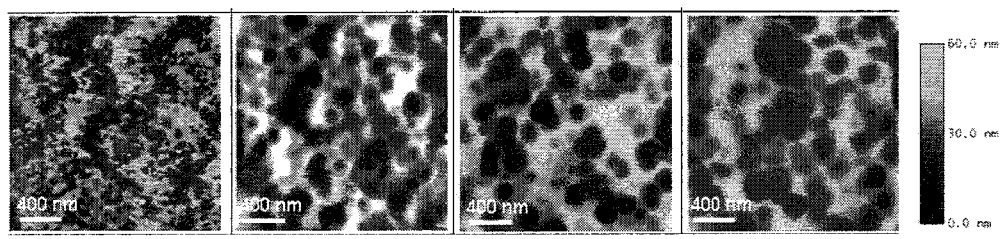
FIGS. 1a-1d show a set of four AFM micrographs of a bulk hybrid silica/metal material structured for various times in a first embodiment of the invention.
Figure 2:
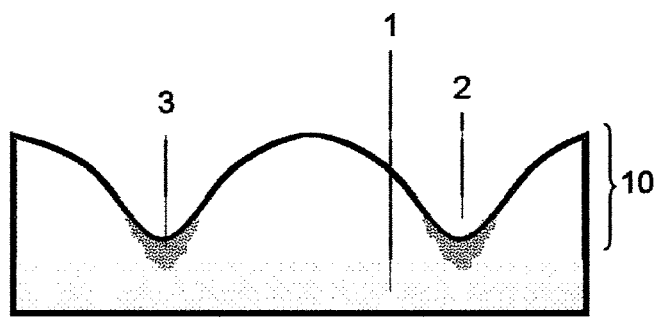
FIG. 2 shows a schematic cross section through a structured glass product obtained with the manufacturing process described with respect to FIG. 1d.

FIG. 2 shows a schematic of a cross section through a structured glass product obtained with the manufacturing process described with respect to FIG. 1d, where 1 denotes material that is not affected by the ion erosion, 2 denotes a recess, 3 denotes a zone rich in said metal species at the bottom of the recesses, and 10 denotes a structured surface.

Figure 3:
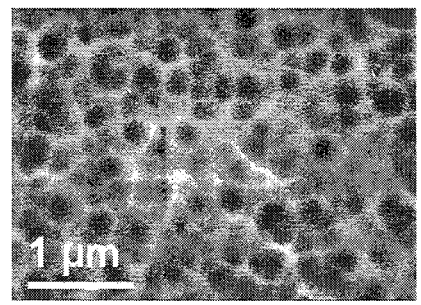
FIG. 3 shows a top-view SEM micrograph of a structured bulk hybrid silica/metal material obtained with the manufacturing process described with respect to FIG. 1d.

The surface of this eroded silver-ion-exchanged glass was then imaged with a SEM. It is possible to observe therein the density of holes created by the erosion. FIG. 3 shows a top-view SEM micrograph of a structured bulk hybrid silica/metal material obtained with the manufacturing process described with respect to FIG. 1d.

FIG. 3 is a SEM micrograph of an area of Planilux glass that was ion exchanged with silver after erosion for 30 minutes using a beam of $Ar^+$ ions having an energy of 500 eV and a flux of 0.09 mA/s·cm$^2$.

Such micrographs were taken in a number of locations on the surface of the sample. It was thus possible to verify that the texture observed by AFM indeed existed over the entire area exposed to the ion beam. The structure is therefore not linked to an edge effect nor to the presence of the platinum fingers of the sample holder nor to a contaminant.

To summarize, Planilux® glass that was ion exchanged with silver was eroded. During the erosion, holes of a few hundred nanometers in diameter were formed over the entire area exposed to the beam. The holes obtained had a diameter W of 50 nm and an average height H of 20 nm. After the erosion, the yellowing of the sample was almost no longer visible.

Silver-containing Planilux® glass was eroded for various times in order to learn more about how the holes form (FIG. 1). The surface of the sample was imaged by AFM after it had been eroded for 5 minutes. It was possible to observe therein holes beginning to form.

It was observed that the holes began to appear after between 8 and 10 minutes of erosion and that their size increased with the erosion time.

A more substantial and/or more rapid structuring may be obtained by changing at least one of the following parameters: increasing the amount of silver present in the glass, heating the glass during the erosion, increasing the flux and/or energy of the ions, changing the incident ion.

COUNTER-EXAMPLE OF A SECOND LESS-STRUCTURED ION-EXCHANGED GLASS

Jena glass, containing a large amount of alumina, was subjected to the same ion exchange of 2 hours in silver nitrate. The silver-ion-exchanged glass obtained was not colored, unlike the Planilux® glass. In $AlO_2$ the oxygen ions are more negatively charged than in $SiO_2$ because aluminum is more electropositive than silicon. The presence of alumina therefore stabilizes the ionic form of the silver in the lattice and thus prevents the silver metal from aggregating to form particles. The detailed concentration profile of sodium and silver oxide and silica was measured by EDX as for the preceding glass.

Here again, there was indeed agreement between the amounts of sodium and silver oxides. The penetration depth of the silver therein was however greater since it was present to a depth of up to 400 microns. The surface contained about 25% $Ag_2O$.

There was no nanoscale structuring of the surface under the erosion conditions chosen and in contrast the surface was smoothed and relaxed. The silver was spread uniformly and in ionic form, and therefore not in aggregate form, in the glass.

EXAMPLES OF STRUCTURED SILICA/SILVER SOL-GEL FILMS

A second hybrid material was prepared using the sol-gel process and eroded.

The sol-gel process allows a mineral polymer, such as silica, to be synthesized at room temperature from organic precursors. In a first step, this precursor is mixed with water so as to hydrolyze it. The solution obtained (called a sol) may be deposited on various substrates such as glass or silicon substrates. During the deposition, the solvent of the solution evaporates until the hydrolyzed precursor condenses to form a mineral polymer matrix. The oxide gel obtained may be shaped, especially into a thin film, until the polymer has completely condensed.

The deposition conditions (rotation speed) allow the thickness to be controlled. Thus, the thickness of the film can be varied over a wide range (from about ten nanometers to a few microns). Other compounds can be added during the hydrolysis such as dyes; dopants; surfactants, which confer a porosity on the film; or organic compounds, which are not altered by the synthesis because it is carried out at room temperature.

Silica films a few hundred nanometers in thickness containing 10 mol % of silver were synthesized by the sol-gel process.

To prepare the silica/silver sol: a sol of 10 wt % TEOS (2 g, 9.6 mmol) in a pH 2 solution of $HNO_3$ (18 g) was prepared and left for three hours with stirring. These pH conditions allowed a high hydrolysis rate while slowing the condensation. After the ethanol formed during the reaction had been evaporated under vacuum, an $AgNO_3$ solution was added to the sol (1 mL, 1 mol·L$^{-1}$) so that $n_{Ag}=[Ag]/([Ag]+[Si])$ such that $n_{Ag}>10\%$.

To prepare the silica/copper sol: a sol of 15 wt % TEOS (3 g, 9.6 mmol) in ethanol (17 g) was prepared. Copper acetate (320 mg, $1.6\times10^{-3}$ mol) and the stoichiometric amount (1 g, $57.7\times10^{-3}$ mol) of water required to hydrolyze the TEOS and the acetate were then added. After the pH had been adjusted to 3, the solution was left for two hours at reflux at 70° C. The molar ratio in the sol was $n_{cu}=[Cu]/([Cu]+[Si])=10\%$.

The thickness of the silver-containing sol-gel film was measured by ellipsometry and was 250±20 nm.

Control sol-gel films of pure silica were synthesized under the same conditions as the silver-containing films.

Deposition and post-deposition treatment: the silver- and copper-containing sols were deposited by spin coating on the substrate (1000 rpm, 100 rpm/s for 2 min).

The samples obtained were baked overnight at 200° C. so as to remove residual solvent from the film and initiate condensation of the silica matrix. A heat treatment at a higher temperature $T_{anneal}$ (700° C.) was applied to the silver-containing samples so as to finish the condensation and cause silver aggregates to form. Their heat treatment determined the oxidation state of the silver. To obtain silver metal, the temperature of the anneal had to be between 500° C. and 750° C.

The control films were little different before and after the erosion whatever the heat treatment used. They had a low roughness (~5 nm). These analyses allowed it to be verified that no structuring occurred with pure silica. It is moreover known that the surface of silica, as with other oxides, relaxes after erosion.

The film pre-annealed at $T_{pre-anneal}=700°$ C. was structured under the effect of the erosion. Holes of a few tens of nanometers in size were formed and distributed over the entire surface of the material, between degas bubbles.

Figures 4A, 4B:
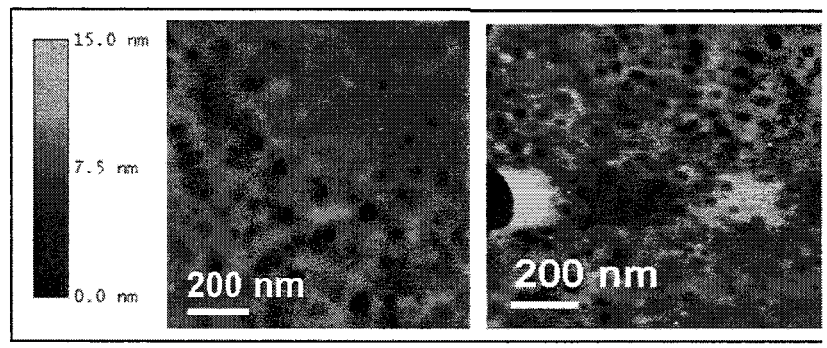
FIGS. 4a-4b show a set of two AFM micrographs at different magnifications of a film of structured hybrid silica/metal material in a second embodiment of the invention.

FIGS. 4a-4b show a set of two AFM micrographs at different magnifications of a film of structured hybrid silica/metal material in a second embodiment of the invention.

FIG. 4 shows AFM micrographs of the silica/silver films obtained by the sol-gel process described above and eroded at room temperature or at 200° C.

It was seen above that films annealed at 700° C. contained aggregates of metal silver. These holes are possibly therefore a result of the erosion of these nanoparticles. Nevertheless, particles commonly observed in silver-containing sol-gel films have characteristic sizes smaller than those of the holes observed. It is possible that the silver diffuses toward these aggregates before they are eroded.

The sol-gel films containing 10% silver and annealed at $T_{pre-anneal}=700°$ C. were eroded at $T_{substrate}=200°$ C. The holes seemed to be more densely distributed after erosion at 200° C. The high temperature of the erosion increased diffusion and therefore should have allowed larger aggregates to form.

Analysis of the micrographs in FIG. 4 yielded the following characteristic sizes:

| Temperature (° C.) | H (nm) | D (nm) | W (nm) |
|---|---|---|---|
| 25 | 5 | 60 | 20 |
| 200 | 8 | 35 | 20 |

The holes were indeed more closely spaced when the erosion was carried out at a high temperature.

Holes of a few tens of nanometers in diameter were formed after a few minutes of erosion. Increasing the temperature was observed to increase the density of the holes. These observations, which are very similar to the observations made for the Planilux® example, confirm the hypothesis that the silver nanoparticles are eroded more rapidly than the silica. The same mechanism may be envisioned here.

EXAMPLES OF STRUCTURED SILICA/COPPER SOL-GEL FILMS

Similarly to the silver examples, silica sol-gel films containing 10 mol % copper were produced. The surface structure was compared before and after 15 minutes of erosion at room temperature.

Figures 5A, 5B:
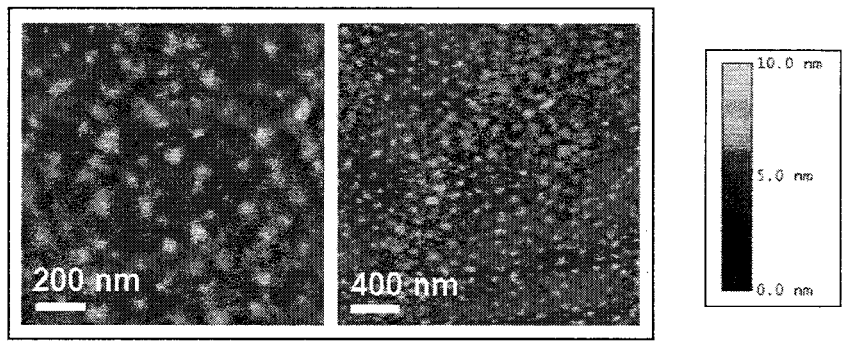
FIGS. 5a-5c show a set of three AFM micrographs at various magnifications of a film of structured hybrid silica/copper material in a third embodiment of the invention.
Figure 5C:
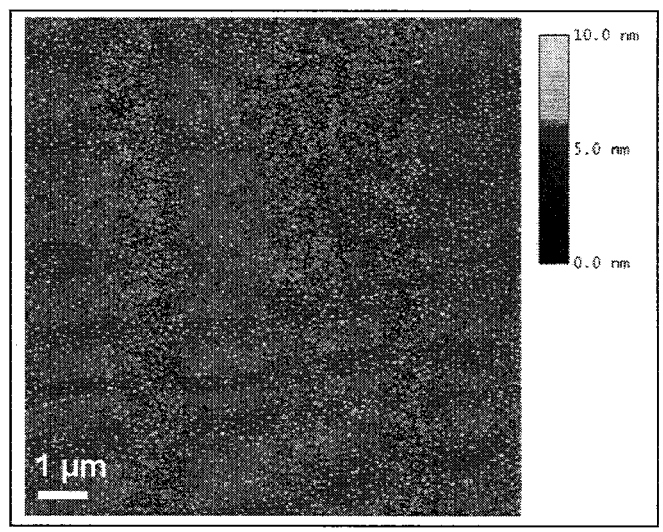

FIGS. 5a-5c show a set of three AFM micrographs at various magnifications of a film of structured hybrid silica/copper material in a third embodiment of the invention. The AFM micrographs taken after a film of copper-doped silica obtained by the sol-gel process had been eroded at room temperature for 15 minutes are shown in FIG. 5. The surface before erosion is not very rough (~2 nm). The film is uniform.

In contrast to silver, reliefs were observed after the erosion instead of nanoscale holes. Bumps about ten nanometers in height were formed.

Figure 6:
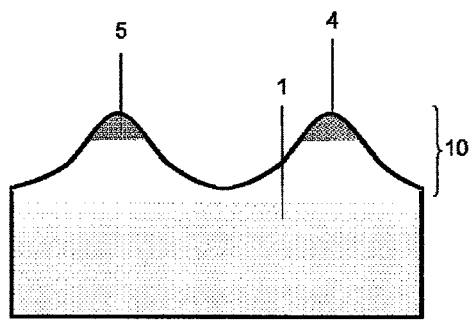

FIG. 6 shows a schematic of a structured glass product obtained with the manufacturing process described with respect to FIG. 5a where: 4 denotes a bump; 5 denotes a zone rich in said metal species at the bottom of the recesses (this zone may form a pure or almost pure droplet of said metal species); and 10 denotes a structured surface.

The bumps may be explained by a mechanism that is the inverse of that of the silver, the copper being eroded less rapidly and remaining in the peaks of the structures that are supplied with copper, as explained in FIG. 6.

To promote bump formation, the erosion temperature was increased to 200° C. to accelerate the diffusion. The erosion time was reduced to 10 min and the size of the bumps seemed to have increased.

Figures 7A, 7B:
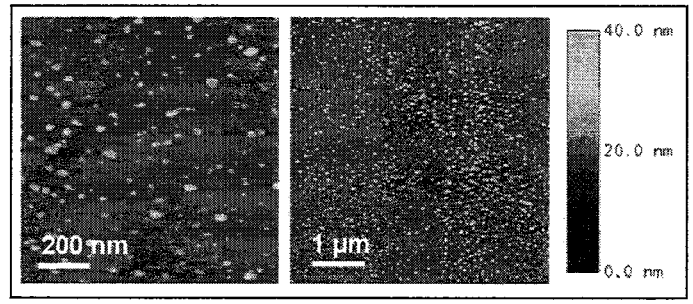
FIGS. 7a-7b show a set of three AFM micrographs at various magnifications of a film of structured hybrid silica/copper material in a fourth embodiment of the invention.

FIGS. 7a-7b show a set of three AFM micrographs at various magnifications of a film of structured hybrid silica/copper material in a fourth embodiment of the invention.

These figures show AFM micrographs of the surface of a copper-doped silica film obtained by the sol-gel process after the film had been eroded for 10 minutes at 200° C.

Incorporating copper in the silica made it possible to rapidly obtain surfaces that were slightly structured after erosion with bumps that were about 10 nm high. The surfaces were more uniform than was the case with silver. The heat treatment decreased the density of the bumps and increased their size. The characteristic sizes are given in the following table:

| Temperature (° C.) | H (nm) | D (nm) | W (nm) |
|---|---|---|---|
| 25 | 5 | 75 | 40 |
| 200 | 20 | 150 | 40 |

A more substantial and/or more rapid structuring may be obtained by changing at least one of the following parameters: by applying a heat treatment beforehand, increasing the amount of copper present in the glass, heating the glass during the erosion, increasing the flux and/or energy of the ions, changing the incident ion.

EXAMPLES OF MAGNETRON-SPUTTERED STRUCTURED SILICA/COPPER FILMS

Industrially, film deposition by magnetron sputtering is a common and well characterized technique. By virtue of magnetron sputtering, it is possible to form, by codeposition, films of submicron- even micron-size thickness having a well controlled composition. In addition, the ion erosion and the magnetron deposition may be carried out in the same vacuum chamber, which is very advantageous in terms of the time taken to carry out the structuring operation and its cost.

A mixed silica/copper film was deposited by magnetron sputtering on a glass substrate. The deposition was carried out at a pressure of $1.6 \times 10^{-3}$ mbar in argon. A target of pure copper in a constant magnetic field and a target of $SiO_2$ in a radiofrequency magnetic field were used. The deposition rate of the silica was 0.8 A/s, and the deposition rate of the copper was chosen so as to obtain the desired concentration (dictated by the positions of the targets and the powers). For example, for a concentration of 20% copper, the deposition rate was set to 0.2 A/s.

In half an hour, a film of hybrid silica more than 1.5 microns in thickness was thus deposited, with a concentration of 20 mol % of copper. Films having a concentration slightly lower than 4 mol % (3.8 mol %) were also deposited by reducing the copper deposition rate, so as to illustrate how important a sufficient copper content is for the structuring (control samples). XPS measurements confirmed that a mixed $SiO_2$/copper film had been formed and the respective concentrations.

The samples were eroded for 15 minutes by $Ar^+$ ions of 500 eV in energy with a constant flux of 0.09 mA/cm² at room temperature (control sample), and also at 175° C. and at 250° C.

For the Films with 20% Copper

Figure 8:
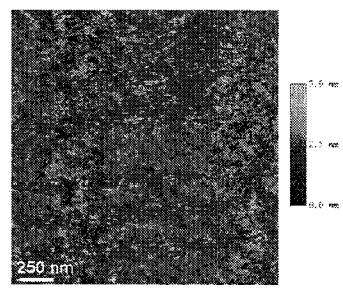
FIG. 8 shows an AFM micrograph of a comparative control example of a film of unstructured hybrid silica/copper material.

FIG. 8 shows an AFM micrograph of a comparative control example of a film of unstructured hybrid silica/copper material. It is an AFM micrograph of the film of copper-doped silica obtained by magnetron sputtering after ion erosion at room temperature. At room temperature, no structure was observed by AFM. The surface remained relatively rough, in contrast to a pure silica film, which is smoothed under ion erosion at a normal angle of attack. The absence of a structure may be due to the copper not being mobile enough in the silica deposited by magnetron sputtering. The activation energy is too high and a heat treatment is required. The lower the copper content, the higher the temperature of the heat treatment needs to be.

Figure 9:
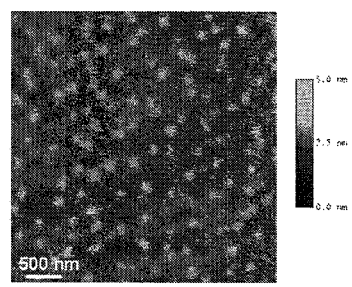
FIG. 9 shows an AFM micrograph of an exemplary film of structured hybrid silica/copper material in a fifth sample embodiment.

FIG. 9 shows an AFM micrograph of an exemplary film of structured hybrid silica/copper material in a fifth sample embodiment. To increase the diffusion rate of the copper, the temperature of the sample, which sample was identical to that shown in FIG. 8, was increased to 175° C. during the erosion.

This time, as for the silica/copper sol-gel, 3 nm high and 200 nm wide bumps separated by a distance D of 500 nm were formed on the surface.

Figure 10:
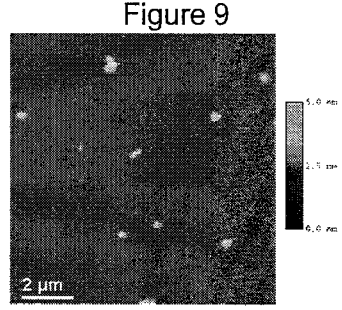
FIG. 10 shows an AFM micrograph of an exemplary film of structured hybrid silica/copper material in a sixth sample embodiment.

FIG. 10 shows an AFM micrograph of an exemplary film of structured hybrid silica/copper material in a sixth sample embodiment. To increase the diffusion rate of the copper, the temperature of the sample, which sample was identical to that shown in FIG. 8, was increased to 250° C. during the erosion. Less dense but larger bumps were thus obtained, the bumps having a height H of 12 nm, a width L of 350 nm and being separated by a distance D of 3 μm.

Figure 11:
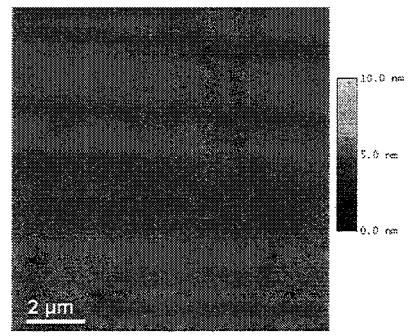
FIG. 11 shows an AFM micrograph of a comparative control example of a film of unstructured hybrid silica/copper material.

FIG. 11 shows an AFM micrograph of a comparative control example of a film of unstructured hybrid silica/copper material. FIG. 11 shows the surface observed by AFM after erosion at room temperature for the films containing less than 4% copper. No structure was observed to form, even when the temperature was increased as in the preceding examples. This illustrates that a minimum amount of said metal element is required in the material.

That it is possible to use magnetron film deposition followed by ion erosion has been demonstrated. To increase the aspect ratio and/or the density of the bumps, films with a higher copper concentration may be deposited. In addition, the importance of the temperature, which does not relax the surface but allows nanocones to be formed, has been demonstrated. The energy and flux of the incident ions could also be adjusted.

the invention claimed is:

1. A process for forming at least one array of irregularities or features that are submicron-size in height and that have at least one characteristic lateral dimension that is micron- or submicron-size, over a surface of a material, by ion erosion with an optionally neutralized ion beam, the process comprising:
   supplying said material with a thickness at least equal to 100 nm, the material being a solid hybrid material that comprises:
      a simple oxide or a mixed oxide of one or more elements, wherein an oxide molar percentage in the material is at least 40%; and
      at least one species, of a different nature to the one or more elements of the simple oxide or the mixed oxide, a molar percentage of the at least one species in the material being greater than or equal to 6 mol % and less than 50 mol % while remaining below the percentage of said simple oxide or the mixed oxide, at least most of the at least one species having a largest characteristic dimension smaller than 50 nm;
   optionally heating said solid hybrid material before said ion erosion, and
   after said supplying and said optional heating, structuring the surface of said solid hybrid material with an ion erosion that lasts less than one hour over an erosion area greater than 1 cm², until said array of features is formed, the structuring optionally being accompanied by heating of the solid hybrid material,
   wherein said solid hybrid material is a film and said supplying comprises depositing the film by physical vapor deposition, on a substrate, by codeposition of the at least one species and the simple oxide or the mixed oxide, the at least one species being a metal species selected from the group consisting of copper, silver, and gold, and the simple oxide is selected from the group consisting of silica, zirconia, tin oxide, and alumina using metal targets in an oxygen atmosphere or using targets made of said simple and mixed oxides.

2. The process as claimed in claim 1, wherein the feature eroded is a hole having an average maximum lateral dimension L that is submicron-size, and having a width greater than 0.3L for an oblique angle of attack and greater than or equal to 0.8L for a normal angle of attack.

3. The process as claimed in claim 2, wherein the at least one species is silver.

4. The process as claimed in claim 1, wherein the feature eroded is a relief having an average maximum lateral dimension L, that is submicron-size, and having a width greater than 0.3L for an oblique angle of attack and greater than or equal to 0.8L for a normal angle of attack.

5. The process as claimed in claim 4, wherein the at least one species is copper.

6. The process as claimed in claim 1, wherein said at least one species is ionized and/or an aggregate, and wherein the effective charge on the at least one species is zero or less than 0.5.

7. The process as claimed in claim 6, wherein the ionized species is copper in silica.

8. The process as claimed in claim 1, wherein the material is heated to a temperature of 70° C. or more before the ion erosion and/or during the ion erosion.

9. The process as claimed in claim 1, wherein the ion erosion employs an etching flux greater than 0.01 mA/cm².

10. The process as claimed in claim 1, wherein the ion erosion employs an energy ranging from 200 to 2000 eV.

11. The process as claimed in claim 1, wherein the mixed oxide is chosen from at least one of the following oxides: mixed aluminum silicon oxide, mixed zirconium silicon oxide, mixed titanium silicon oxide.

12. The process as claimed in claim 1, wherein said solid hybrid material is metastable before said ion erosion.

13. The process as claimed in claim 1, wherein the structuring of the surface of the solid hybrid material is carried out with the ion erosion without applying a mask, after the supplying and before the structuring, over the surface of the solid hybrid material to define the at least one array of irregularities or features.

* * * * *